United States Patent [19]

Morefield

[11] Patent Number: 5,007,523
[45] Date of Patent: Apr. 16, 1991

[54] CONVEYOR BELT SCRAPER MECHANISMS

[76] Inventor: Allen J. Morefield, P.O. Box 534, Tazewell, Va. 24651

[21] Appl. No.: 503,439

[22] Filed: Mar. 30, 1990

Related U.S. Application Data

[63] Continuation-in-part of Ser. No. 232,663, Aug. 16, 1988, abandoned.

[51] Int. Cl.$^5$ ............................................... B65G 45/00
[52] U.S. Cl. .................................... 198/497; 198/499; 15/256.5
[58] Field of Search ............... 198/497, 499; 15/256.5, 15/256.51, 256.6

[56] References Cited

U.S. PATENT DOCUMENTS

| | | | |
|---|---|---|---|
| Re. 31,338 | 8/1983 | Hurt | 198/502.4 X |
| 3,342,312 | 9/1967 | Reiter | 198/499 |
| 3,881,401 | 5/1975 | Bimba | 92/169.1 |
| 3,973,595 | 8/1976 | Schmoll | 91/449 X |
| 4,053,045 | 10/1977 | Reiter | 198/499 |
| 4,117,706 | 10/1978 | Lami | 91/433 X |
| 4,182,444 | 1/1980 | Fisher | 198/499 |
| 4,189,046 | 2/1980 | Ward et al. | 198/499 |
| 4,242,947 | 1/1981 | Renner et al. | 92/108 |
| 4,269,301 | 5/1981 | Gibbs | 198/499 |
| 4,280,531 | 7/1981 | Milberger et al. | 91/526 X |
| 4,402,394 | 9/1983 | Stoll | 198/499 |
| 4,457,423 | 7/1984 | Stoll | 198/619 |
| 4,506,742 | 3/1985 | Fukase | 91/229 X |
| 4,520,917 | 6/1985 | Sillivent et al. | 198/499 |
| 4,533,036 | 8/1985 | Gordon | 198/499 |
| 4,633,999 | 1/1987 | Perneczky | 198/499 |
| 4,674,397 | 6/1987 | Wilcox | 91/235 |
| 4,696,388 | 9/1987 | Stoll | 198/497 |
| 4,729,224 | 3/1988 | McAteer | 91/397 X |
| 4,734,013 | 3/1988 | Valavaara | 91/502 X |

FOREIGN PATENT DOCUMENTS

| | | | |
|---|---|---|---|
| 0004809 | 10/1979 | European Pat. Off. | 198/497 |
| 0328171 | 8/1989 | European Pat. Off. | 198/499 |
| 3409076 | 9/1985 | Fed. Rep. of Germany | 198/499 |
| 3624623 | 3/1987 | Fed. Rep. of Germany | 198/499 |
| 88/00916 | 2/1988 | PCT Int'l Appl. | 198/499 |

OTHER PUBLICATIONS

Wolansky et al, Fundamentals of Fluid Power, 1977, pp. 58–68.
Machine Design, Fluid Power Reference Issue, Sep. 27, 1984, pp. 147–149.

Primary Examiner—Robert P. Olszewski
Assistant Examiner—Cheryl L. Gastineau
Attorney, Agent, or Firm—Lowe, Price, LeBlanc, Becker & Shur

[57] ABSTRACT

A conveyor belt scraper assembly includes a plurality of blade scraper units detachably mounted to a support shaft with a clamping bolt and hold-down bar arrangement. The plural scraper units are preferably molded from resilient material. The one or more scraper units adapted to contact center portions of the conveyor belt is preferably formed of a harder material than the scraper units contacting side portions of the belt. The assembly is driven into and out of scraping contact with the conveyor belt into means of a piston and cylinder arrangement with the cylinder preferably actuated with pressurized water from conventional sources as available in a mining environment. The cylinder is transparent to permit visual monitoring of the location of the piston head. First and second marker tapes fixed to the transparent cylinder provide points of reference indicative of blade wear and the need for replacement when the piston head contacts the second marker.

12 Claims, 4 Drawing Sheets

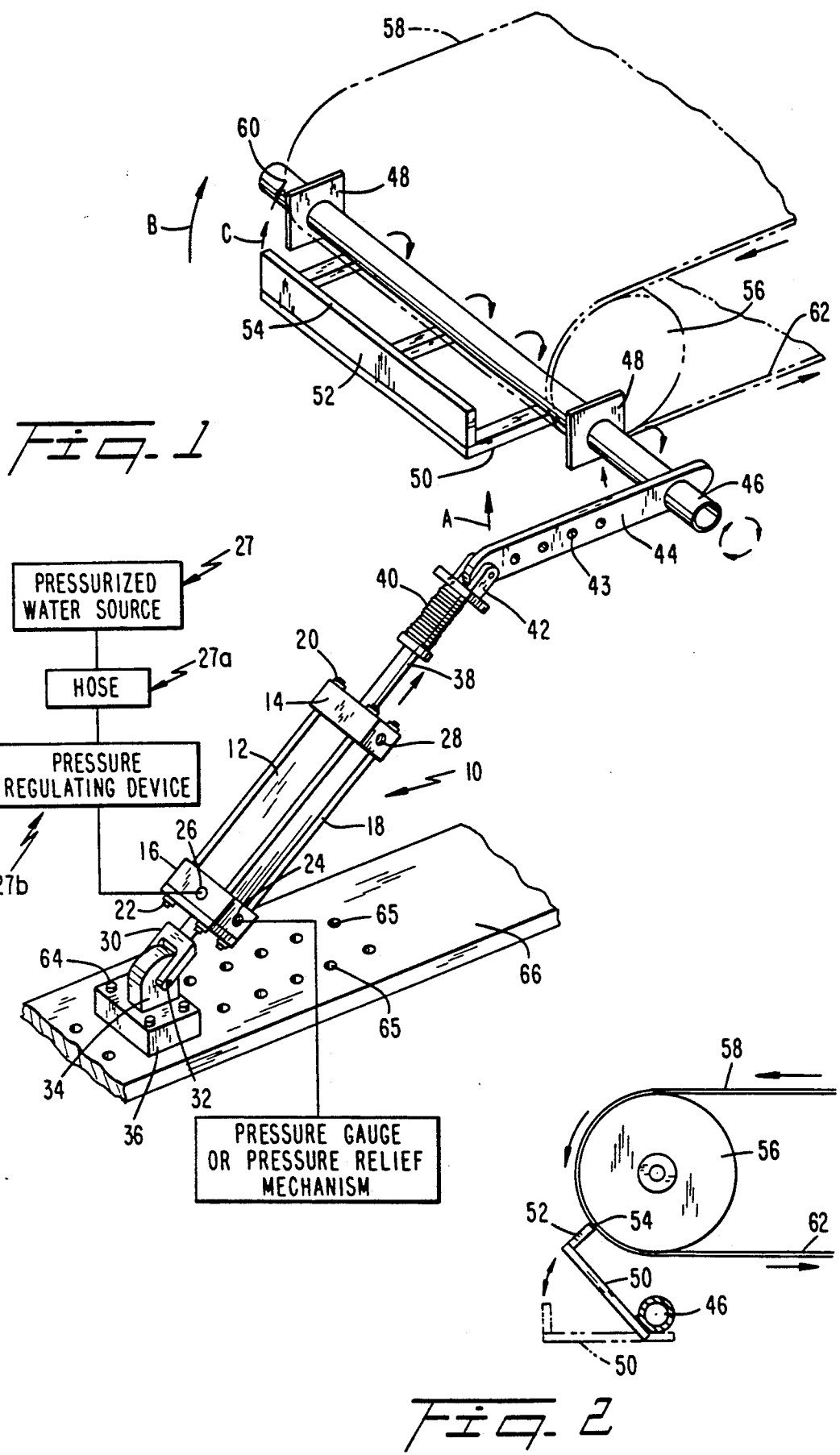

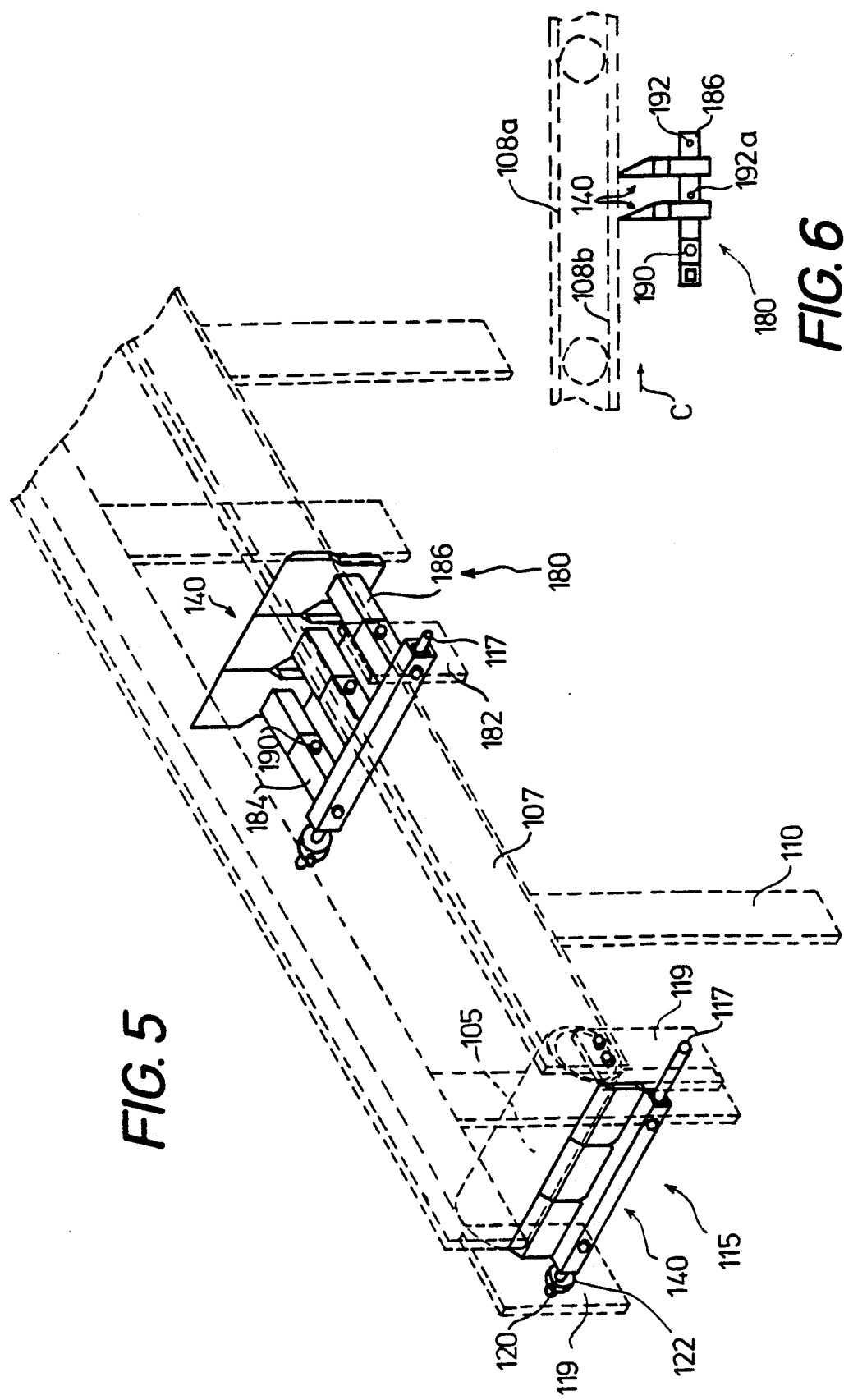

1

CONVEYOR BELT SCRAPER MECHANISMS

RELATED APPLICATIONS

The present application is a continuation in part of application Ser. No. 232,663 filed Aug. 16, 1988 now abandoned.

TECHNICAL FIELD

The present invention generally relates to conveyor belt scraper mechanisms and, more particularly, to belt scraping mechanisms with replaceable belt scraper units.

BACKGROUND ART

In my co-pending application, as depicted in FIG. 1 and 2 herein for ease of explanation, there is disclosed a belt scraping apparatus 10 including a cylinder 12 in sealing contact with upper and lower end caps 14 and 16 sealed to ends of the cylinder with plural tension rods 18 each applying a predetermined tightening force to the end caps by conventional heads or nuts 20 and 22, respectively. The lower end cap 16 may be provided with two openings or ports 24 and 26 formed to receive known types of fittings. One of these openings or ports 26 is connected to a pressurized water source 27 through a hose 27a and an optional pressure regulating device 27b to admit pressurized water into the lower end of cylinder 12 where it acts on a piston head of a single acting type slidably contained within the cylinder.

The pressurized water source, in a mining environment for example and as in the present invention, is preferably a conventional pumping station P that generally comprises an available source of water supplied by a pump located outside the mine through the hose 27b to the mining site at a pressure generally between 45-300 psi. This pressurized water is conventionally used for cleaning of equipment, and as a means for fighting fires within the mine. In accordance with the invention described in my co-pending application, the piston within the cylinder is of a single acting type in that the piston is moved to and maintained at the upper end of the cylinder under the action of pressurized water to maintain the belt scraper described more fully below in contact with the conveyor belt until such time as the supply of pressurized water into the lower end of the cylinder is shut off via the pressure regulating device. The other opening 24 is for connection to a pressure release mechanism (optional and not shown) and preferably a pressure gauge. A closeable fitting 28 in the upper end cap 14 allows drainage of any pressurized water that may leak past the piston head contained within the cylinder 12 during use.

The pressurized water cylinder assembly described above, in accordance with my co-pending application, is mounted by an attachment fork 30 (secured to the bottom of end cap 16) to a base 36 via rotatable connection to a trunnion 34 with pin 32. The piston is connected to a connecting rod 38 sealingly and slidably guided through upper end cap 14. Rod 38 is moveable in opposite directions indicated by arrow A in a direction parallel to the cylinder axis. The cylinder 12, the piston therewithin, end caps 14 and 16, are preferably made up of materials which are not corroded by the pressurized water, such as fiber glass, acrylic plastics, or reinforced composites that are readily lubricated by water without the need for externally provided lubrication.

The upper end of connecting rod 38 supports a fork element 42 rotatably pinned to a lever arm 44 rigidly connected to a shaft 46 rotatably supported in a pair of bearings 48.

A plurality of through holes 43 are distributed along the length of arm 44 for selective engagement of pin 42 therethrough, which persons skilled in the mechanical arts will immediately appreciate as a means to discretely adjust the moment arm at which the connecting rod force is applied about the axis of shaft 46.

Rigidly attached to a portion of shaft 46 between supporting journal bearing elements 48 is a transverse element 50 at a distal end of which is attached a scraper blade element 52 having a scraping edge 54. As is indicated in phantom lines in FIG. 1, a cylinder 56 of circular cross-section is conventionally used to support and guide thereover an approaching length 58 of a moving belt which passes over the cylindrical outer surface of cylinder 56 and returns for reloading as a moving length 62 of the belt. Naturally, the scraper blade element 52 must be so positioned vis-a-vis cylinder 56 and the moving belt as to be itself movable into controlled scraping contact with moving belt length 62, as best understood with reference to FIG. 2.

Although considerable adjustment of the applied moment to rotate shaft 46 is obtained by selecting one of the plurality of through holes 43 in arm 44 for a given position of base 36, even further adjustment may be obtained by relocating attachment means 64, e.g., conventional nuts and bolts into any of paired apertures 65 in a fixed support element 66 that stays in place vis-a-vis the conveyor belt structure. Given the structure described hitherto, it is easy for a user, simply by loosening a few bolts and nuts such as 64 and/or repositioning pin 42 in any of apertures 43, to very quickly and securely adjust a component of the force providable by connecting rod 38 and the moment arm at which such a force is applied to generate a useful torque about the axis of shaft 46. There is, thus, provided in the present invention a very easily adjustable means for discretely controlling the force with which scraper blade element 52 can be applied to a length 62 of a moving belt to scrape the same. Note that the adjustment so described is in addition to and complementary of any adjustment that may be obtained by regulating the pressure of the pressurized water actuating the piston within cylinder 12.

In practice, therefore, once the user using his judgment and experience decides exactly which holes 43 and 65 to use to locate the cylinder assembly 10, he or she will set a pressure regulator of known type to limit the pressure of pressurized water that may enter cylinder 12 to a maximum value, thereby ensuring that a desired factor of safety is obtained to avoid accidental rupture of cylinder 12. He or she then operates whatever controls are necessary, e.g., a valve, to provide pressurized water to cylinder 12 to generate an outward motion of connecting rod 38 vis-a-vis cylinder 12, so that a force is applied as indicated by arrow "A" in a direction normal to arm 44. This will cause shaft 46 and the attached scraper blade assembly to rotate clockwise as illustrated in FIG. 1.

The scraper blade assembly therefore moves in an arcuate path, as indicated by the curved arrow B, toward contact with the belt 58 passing over the outer surface of cylinder 56. Upon sufficient movement of blade element 52, the scraping edge 54 thereof will move as indicated by the arrows C into scraping contact along a line 60 (parallel to the axis of shaft 46) so that substantially the entire length of blade edge 54 is controllably pressed against the outer surface of turning moving length 62 of the conveyor belt. For most applications it may be most convenient to ensure that this line of contact 60 is located so that scraper blade edge 54 presses on the conveyor belt in a manner resisted by the outer surface of cylinder 56.

While the foregoing apparatus 10 of my co-pending application provides a highly desirable belt scraping action in a manner using pressurized water that is entirely safe and compatible with the use of equipment in sensitive locations without increasing any operational hazards, the following problems noted. First, since the scraper blade 52 is formed of the same material extending continuously for substantially the full width of the belt, the blade tends to wear unevenly since most of the material conveyed along the upper run of the belt gathers at the center longitudinally extending portion thereof, exerting greater abrasive contact against the center part of the scraper than at the edge portions of the scraper located adjacent the center part. Thereby, the belt scraper wears unevenly and eventually assumes a curved concave configuration with minimal if any scraping contact between the center portion of the scraper and the center of the belt where scraping is particularly necessary.

In my blade scraper mechanism of the aforesaid co-pending application, the scraping blade is of one piece extending transversely the full width of the conveyor belt. Replacement of the scraper blade necessitates removal of the entire blade element as well as the shaft 46 from its journal supports 48.

It is accordingly one object of the present invention to provide a scraper element for a belt scraper mechanism that wears evenly along the entire length of the scraper.

Another object of the invention is to easily detach the scraper element from the scraper mechanism for ease of replacement or repair.

Still another object of the invention is to form the scraper from individual scraper units easily detachably mounted to the scraper mechanism to form a continuous edge extending the full width of the belt.

Another object of the invention is to detachably mount the individual scraper units without requiring removal or manipulation of the blade scraper unit support shaft assembly from the conveyor.

Still another object is to provide a belt scraper mechanism wherein the individually mounted belt scraper units are of different hardness along the width of the conveyor belt to insure even wear of the belt scraper units across the entire belt width.

Yet a further object is to form the at least one or more individual belt scraper units mounted to contact the center portion of the belt where the most abrasive conditions occur of a material having a greater hardness than belt scraper units mounted to contact lateral or side portions of the belt where less abrasive conditions occur due to a smaller amount of abrasive material on the conveyor belt in comparison with greater amounts of abrasive material conveyed on center portions of the belt.

During belt scraping action, the belt scraper is subject to wear and must eventually replaced. However, as a result of scraping, the belt scraping element becomes coated with dirty and gritty material scraped from the belt, rendering it difficult if not impossible to visually monitor the belt scraper element to determine when replacement is necessary.

Still another object of the present invention is to provide a means for visually detecting the extent of wear of the belt scraper elements to determine when replacement becomes necessary.

Another object of the invention is to determine when replacement of the belt scraper units becomes necessary by monitoring the degree to which the piston head moves during belt scraping operation as a function of further extension of the piston connecting rod which occurs as the belt scraper wears and which is proportional to the extent of incremental wear.

Yet a further object is to monitor movement of the piston head as a function of wear of the belt scrapers by visually marking reference locations on a transparent cylinder carrying the piston head to temporarily halt belt scraping operations for replacement of one or more of the belt scraper units when the piston head travels along the cylinder to a position adjacent one of the reference marks.

In my aforesaid co-pending application, the belt scraping element is depicted in contact with the belt as it passes around the conveyor end roll. While this a commonly accepted mounting arrangement for the scrapers, the belt scraper elements wear quickly when used to clean the conveyor belts formed with wire seams, i.e. as the wire seams pass around the conveyor 10 roller, they generate considerable abrasive contact with the belt scraper elements causing premature wear and frequent replacement.

Another object of the invention is to provide a belt scraper mechanism having one or more resilient belt scraper units mounted to contact the lower run of the conveyor belt at a location spaced from the conveyor roller, i.e. without counter-pressure from the conveyor roller, particularly when using seamed conveyor belts.

DISCLOSURE OF THE INVENTION

A belt scraper mechanism, in accordance with the present invention, comprises a cylinder containing a piston slidably moveable therein to actuate a belt scraper into a scraping position to scrape a moving conveyor belt. The piston is connected to the belt scraper via a piston connecting rod. The belt scraper includes a plurality of resilient belt scraper units mounted to a rotatable support assembly rotatable about its axis in response to movement of the connecting piston rod. The blade scraper units form a continuous scraping edge across substantially the full width of the belt.

In accordance with a further improvement feature of this invention, one or more scraping units adapted to contact center portions of the belt are of greater hardness than adjacently mounted scraper units adapted to contact side portions of the conveyor belt. Since the abrasive material being conveyed tends to collect in the center of the belt, the feature of forming the center mounted belt scraper units of harder material than the laterally mounted units advantageously enables the substantially continuous scraping edge to wear evenly without bowing and concomitant loss of contact with the center portions of the belt.

As used in this application, "wearing evenly" essentially means that the laterally mounted scraper units of softer material wear faster than the center mounted scraper units of harder material, however, since the center mounted units are exposed to more abrasive material, the resultant substantially continuous scraping edge defined by the scraper units remains substantially linear.

Each blade scraper unit is preferably formed from a resilient material, such as polyurethane, wherein the hardness of the center mounted belt scrapers is approximately 90-92 durometers with the softer laterally mounted belt scraper units having a hardness of approximately 78-82 and preferably 80 durometers.

In accordance with other features of the invention, the belt scraper support assembly preferably comprises a circular shaft rotatably mounted to a pair of conventional support frames forming part of a conventional conveyor support so as to extend the beneath the conveyor lower run. A pair of adjustable positioning collars at opposite ends of the circular support shaft are adapted to contact outside vertical surfaces of the support frames to retain the shaft in position beneath the conveyor lower run. A square shaft for supporting the belt scraper units is removably mounted on the cylindrical shaft and retained in a fixed position thereon by means of hold-down bolts.

The square shaft is formed with rectangular and preferably square mounting projections projecting from one side of the square shaft at spaced intervals. Each blade scraper unit has a base portion formed with a square opening tightly interfitting with the square mounting projection and retained thereon by means of a clamping plate and hold-down bolt. The height of the mounting projection is approximately equal to or slightly less than the depth of the square opening to ensure proper clamping of each blade scraper unit to the square mounting shaft. Thusly mounted, the adjacent sides of the belt scraper units abut each other to enable their individual scraping edges to form a continuous scraping edge.

With the foregoing arrangement, each blade scraper unit is easily removed for replacement or repair by removing the hold-down bolt and clamping plate without requiring removal of the square or circular support shafts from their operative position beneath the conveyor.

A lever arm non-rotatably secured to one end of the circular shaft is rotatably connected at its opposite end to the distal end of the connecting piston rod. Extension of the connecting piston rod by advancement of the piston through the cylinder causes the circular shaft and thereby the square shaft to corotate the belt scraper units into scraping contact with the conveyor belt.

In accordance with a second embodiment of the invention, each square mounting projection is hollow and the belt scraper units are respectively interconnected to the associated square mounting projection by means of an elongate rectangular mounting block having an anchoring projection at one end thereof interfitting within the hollow of square mounting projection and fastened thereto with a nut and bolt assembly extending through the square mounting projection and the anchoring projection. The cross-section of each mounting block is substantially identical to the cross-section of the square mounting projections to enable the individual belt scraper units to be respectively mounted to the distal ends of the mounting blocks and retained thereon with a clevis pin and cotter pin arrangement. This embodiment is preferred for use with a seamed conveyor belt and is therefore mounted to the conveyor support frame so that the belt scraper units contact the conveyor lower run downstream from the end support roll. However, this embodiment may also be used in conjunction with the primary belt scraper assembly mounted adjacent the downstream end roller, particularly when scraping of non-seamed conveyor belts is to be performed.

The cylinder containing the piston head is preferably transparen to enable visual observation of the relative position of the piston head within the cylinder. During operation, the piston head assumes a first position within the cylinder which corresponds to the point at which the scraper elements are in scraping contact with the conveyor belt. As the scraper blades wear, the piston advances from this first position. To prevent excessive wear and therefore scraper blade replacement as necessary, the first position of the piston head is visually marked with tape and the like applied to the outer surface of the cylinder. A second position is identified with a second piece of tape and the like provided along an upper portion of the cylinder. The spacing between the first and second markers corresponds to the amount of permissible wear of the blade scraper elements before replacement is necessary.

The improvement embodiments disclosed herein may employ pressurized water for advancing the piston head within the cylinder as in my co-pending application. It will be understood, however, that the improvements of the present invention may also be operated with other types of working fluids and actuating mechanisms capable of pivoting the primary or secondary belt scraper mechanisms into and out of contact with the conveyor belt.

A more complete appreciation of the invention and many attendant advantages thereof will be readily perceived as the same becomes better understood by reference to the following detailed description when considered in connection with the accompanying drawing figures.

BRIEF DECRIPTION OF DRAWINGS

FIG. 1 is a perspective view of a blade scraper assembly as disclosed in my co-pending application;

FIG. 2 is a partly schematic sectional view of the blade scraper mechanism of FIG. 1;

FIG. 5 is a perspective view of a secondary belt scraping mechanism in accordance with a further improvement feature of my present invention;

FIG. 6 is a partly schematic and sectional view of the secondary belt scraping mechanism of FIG. 5;

BEST MODE FOR CARRYING OUT THE INVENTION

Figure 3:
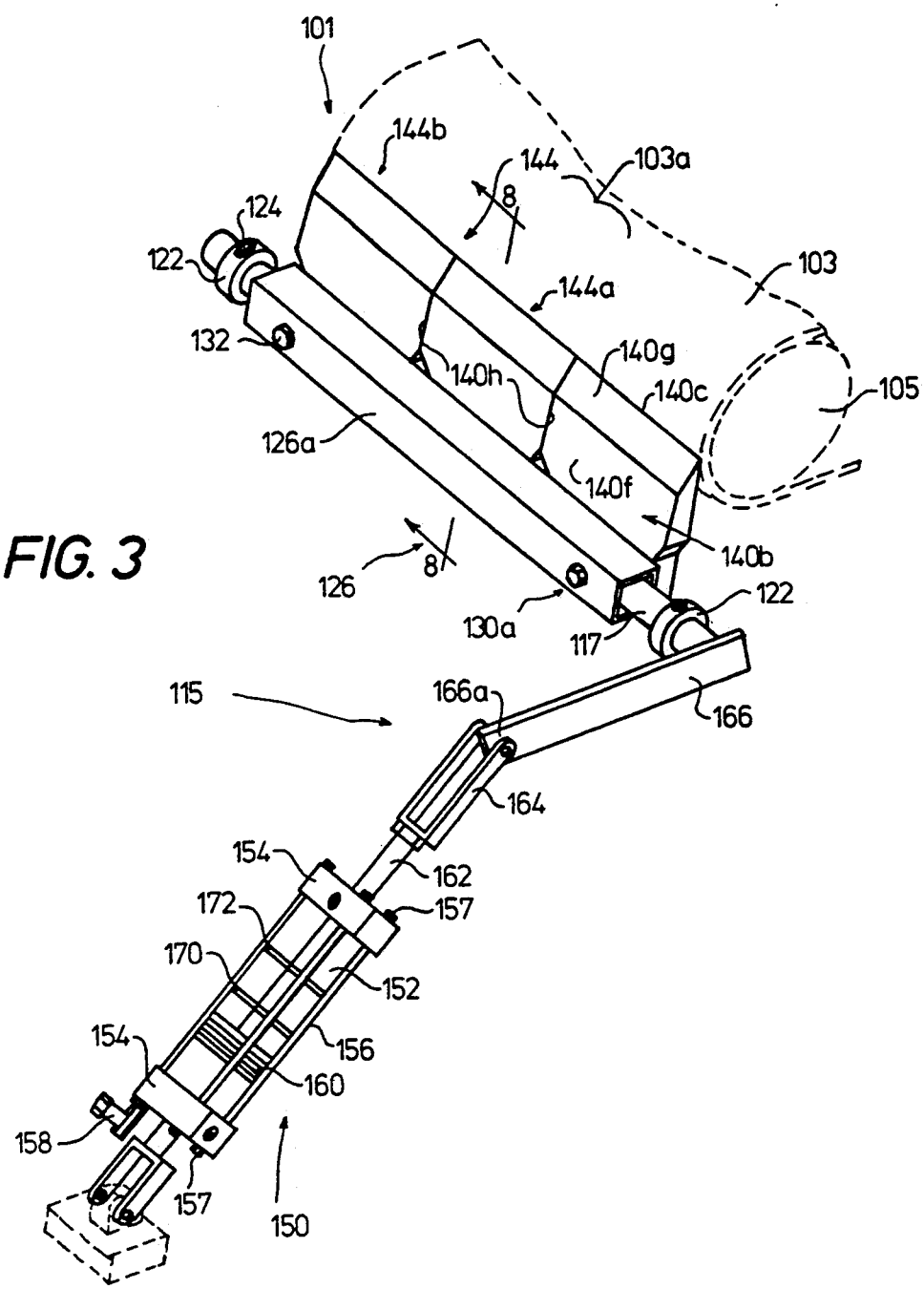
FIG. 3 is a perspective view of a primary belt scraping mechanism in accordance with an improvement feature of my present invention.
Figure 4:
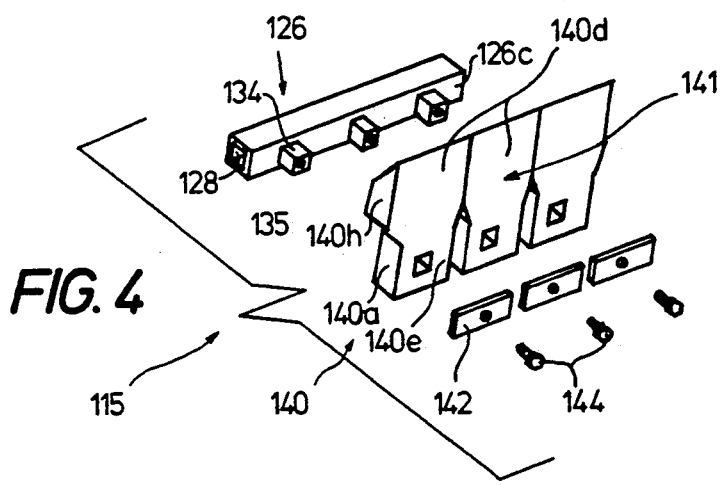
FIG. 4 is an exploded perspective view of the primary belt scraping assembly depicted in FIG. 3.

FIG. 3 is an illustration of a conventional conveyor 101 such as may be used in an underground or surface mining environment for conveying mine materials (e.g., coal) from the mining site to an offsite or an accumulating location. The conveyor system 101 conventionally comprises an endless conveyor belt 103 disposed around end rolls 105 each having shafts (not shown) respectively extending from opposite ends thereof. The support shafts are conventionally mounted within bearings (also not shown) located in a pair of side frame members 107 (FIG. 5) extending longitudinally along opposite sides of the conveyor belt 103. The side frame members 107 are interconnected with cross members (not shown) extending between the upper and lower runs 108a and 108b of the conveyor belt. Plural vertical legs 110 attached to the side frames 107 support the conveyor in an elevated position above the ground.

In accordance with a first improvement feature of the present invention, there is provided a primary belt scraping mechanism 115 comprising a hollow cylindrical support shaft 117 preferably mounted to side support plates 119 welded or bolted to the side frame members 107 to locate the cylindrical support shaft parallel to the downstream roll 105. More specifically, opposite ends of the support shaft 117 extend through aligned openings 120 in the respective side plates 119. The support shaft 117 is maintained in an axially stationary location with cylindrical collars 122 movably mounted to the opposite ends of the support shaft and clamped in desired location, inwardly or outwardly adjacent the respective support plates 119, by means of clamping screws 124 extending radially through each collar to bear against the outer surface of the support shaft in clamping contact.

A scraping blade support shaft 126 is mounted on a center portion of the cylindrical support shaft 117. In the preferred embodiment, the blade support shaft 126 is of hollow construction with a square cross-sectional passage 128 extending entirely therethrough and dimensioned to slidably receive the cylindrical support shaft 117 during initial assembly. The blade support shaft 126 is preferably clamped to the cylindrical support shaft 117 between the supporting collars 122 with two sets of clamping screws 130a and 130b. The first set 130a includes a pair of clamping screws 132 extending through one flat surface 126a of the hollow square shaft 126 at opposite ends thereof into clamping contact with the outer surface of the cylindrical support shaft 117. The second set 130b comprises a pair of clamping screws 132 extending radially through a second flat surface 126b of the square shaft orthogonal to the first set. Advantageously, the first and second orthogonal sets of clamping screws 130a, 130b exert bi-directional clamping pressure against the outer surface of the cylindrical support shaft 117 to resist slippage during co-rotation of the square shaft with the cylindrical support shaft.

A third flat surface 126c of the square support shaft 126, formed parallel to the first surface 126a, has a plurality of square mounting projections 134 (e.g., 2 ×2 ×1-½inch steel blocks) attached thereto with a tapped hole 135 extending and terminating within each mounting projection. A plurality of scraper blade units 140 are respectively mounted to each projection 134 by means of a flat hold-down plate 142 and a mounting bolt 144 received in the threaded opening 135 of the mounting projection. Each scraper blade unit 140 has a rectangular mounting section 140a of a thickness slightly greater than the height of the square mounting projection 134; this enables the hold-down plate 142 to press against the mounting section to exert clamping contact between the section 140a and the associated face 126c of the blade support shaft. Each unit 140 also includes a blade section 140b formed with a tapered scraping edge 140c having a first surface 140d which is coplanar with the outer surface 140e of the blade mounting section 140a.

A second surface 140f extends from the inner surface of the blade mounting section (i.e., in clamping contact with the square support shaft) and is tapered towards the scraping edge 140c. A third tapered surface 140g extends between the second surface 140f and the scraping edge 140c. Side edges 140h extending between the first, second and third surfaces 140d, 140f and 140g of each blade section 140b are parallel to each other and define the outermost lateral extent of each blade section. In assembled relationship, adjacent side edges 140h of adjacent blade scraper units abut each other to enable the respective scraping edges 140c to define a continuous uninterrupted blade scraping edge 144 extending substantially the entire length of the belt 103.

The cylindrical support shaft 117 and the square blade support shaft 126 co-rotate about their common longitudinal axis by means of a piston and cylinder arrangement 150 so as to pivot the belt scraper units 140 and continuous scraping edge 144 thereof into and out of scraping contact with the conveyor belt 103. As best depicted in FIG. 3, a cylinder 152 is in sealing contact with upper and lower end caps 154 sealed to ends of the cylinder with plural tension rods 156 each applying a predetermined tightening force to the end caps by conventional heads or nuts 157, respectively. The lower end cap 154 may be provided with an opening or port receiving a known type of fitting 158 connected to a pressurized water source 27 through a hose 27a and an optional pressure regulating device 27b to admit pressurized water into the lower end of the cylinder where it acts on a piston head 160 of a single acting type slidably contained within the cylinder. The pressurized water source, in a mining environment for example, is a conventional pumping station P that generally comprises an available source of water supplied by a pump located outside the mine through the hose to the mining site at a pressure generally between 45–300 psi. This pressurized water is conventionally used for cleaning equipment, and as a means for fighting fires within the mine. Under the pressure of water, the piston is moved to and maintained at a mid or upper end portion of the cylinder. Movement of the piston head 160 through the cylinder 152 causes corresponding movement of a connecting rod 162 attached to the piston head and projecting through the upper end cap 154. A fork element 164 is connected to the upper end of the connecting rod 162 and rotatably pinned to the distal end 166a of a lever arm 166 rigidly connected (e.g., welded) to one end of the cylindrical support shaft 117.

Figure 8:
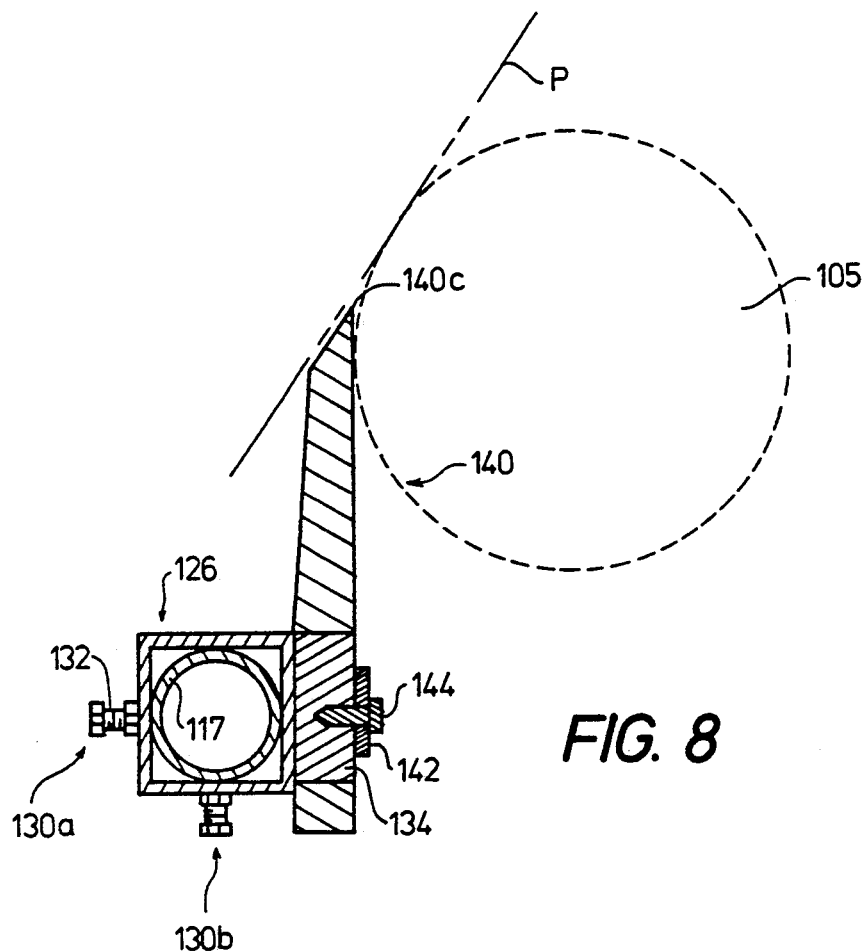
FIG. 8 is a sectional view taken along the line 8—8 of FIG. 3.

In operation, as mentioned above, pressurized water admitted into the lower end of the cylinder 152 lifts the piston head 160 and thereby the connecting rod 162 to rotate the belt scraper units 140 into scraping contact with an outer surface of the conveyor belt 103. To minimize wear, the tapered scraping edge 140g preferably extends in substantially a tangential plane P (FIG. 8) relative to the outer surface of the belt wrapped around the end roll 105.

Since most of the materials being conveyed on the upper run 108a concentrate along mid-portions 103a of the belt 103, the center portions 144a of the continuous scraping edge 144 are generally subject to greater wear than the side portions 144b. To obtain uniform wear along the entire scraping edge 144, there is preferably provided at least three blade scraper units, one mounted to contact each side portion of the belt with a center unit 141 mounted to contact a central belt portion 103a. The blade scraper units are preferably formed from a resilient material such as polyurethane and, in accordance with the present invention, the hardness of the center unit 141 is greater than the hardness of the adjacent side units. The softer material of the side units, for example, may have a hardness of approximately 78–82 durometers while the hardness of the center unit is preferably 90–92 durometers. In this manner, since the one or more center mounted units 141 are of harder material than the side units and are also exposed to more abrasive material, the resultant substantially continuous scraping edge 144 defined jointly by the scraper units remains substantially linear during continuous use, instead of assuming a concave shape which causes insufficient removal of material from center portions of the belt.

In accordance with another improvement feature of the invention, the cylinder 152 is preferably transparent to enable visual observation of the relative location of the piston head 160 within the cylinder during scraping operation. More specifically, the location of the top of the piston head 160 when the cylinder 152 is actuated with pressurized water is preferably marked with, for example, a piece (first marker) of reflective tape 170 secured to the outer surface of the cylinder and a second piece of reflective tape 172 (second marker) is mounted to the outer cylinder surface upwardly from the first marker. The spacing of the second marker tape 172 from the first marker 170 generally corresponds to the desired extent of wear of the blades 140b before replacement becomes necessary. In other words, by marking the initial actuated position of the piston head 160 with a first marker 170 and providing a second marker 172 in the manner described above, a desired amount of blade wear can be monitored and maintained to ensure optimal scraping of the conveyor belt 103.

The feature of utilizing a transparent cylinder with first and second markers 170, 172 is a preferred means for monitoring blade wear since the blade sections 140b of the blade scraper units become coated with dirt and grime during operation making it difficult, if not impossible, to visually observe the condition of the scraping edge 144.

Figure 7:
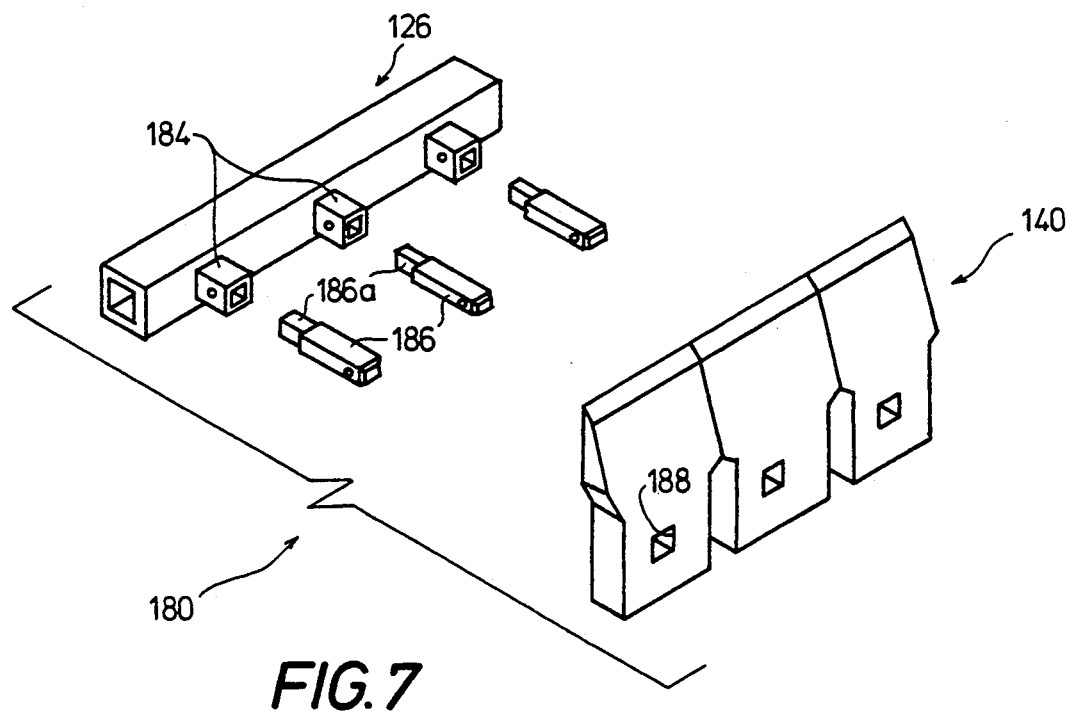
FIG. 7 is an exploded perspective view of the secondary belt scraping mechanism.

The primary belt scraper assembly 115 is mounted to the downstream end of the conveyor to preferably contact the belt 103 as it extends around the drive roller 105. In accordance with another feature of this invention, a secondary scraper assembly 180, as depicted in FIGS. 5, 6 and 7, is preferably located to contact the lower run 108b or return of the conveyor belt to effect a secondary scraping action. As depicted in FIG. 5, the secondary scraper assembly 180 also utilizes a cylindrical support shaft 117, clamping collars 122 and a square blade support shaft 126 with the first and second sets of clamping bolts 130a, 130b as described supra in connection with the primary belt scraper assembly 115. The cylindrical support shaft 117 of the secondary assembly is mounted to a pair of side support plates 182 to extend transversely beneath the lower run 108b. The secondary assembly also features a lever arm 166 and piston and cylinder arrangement 150 substantially identical or identical to the aforesaid corresponding arrangements utilized in the primary blade scraper assembly 115.

Advantageously, the secondary blade scraper assembly 180 also utilizes blade scraper units 140 which are identical to the blade scraper units 140 of the primary assembly 115. However, to ensure that the continuous scraping edge 144 extends generally perpendicular to the lower run 108a as depicted in FIG. 6, the blade support shaft 126 is formed with a plurality of hollow mounting projections 184 (e.g., two inch square tubing) welded to a common side of the square blade support shaft. Each mounting projection 184 has a hollow interior of square cross-section adapted to receive a machined end 186a of a blade support member 186 of corresponding square cross-section to ensure a tight non-rotatable fit. The blade support 186 is preferably formed from a resilient material (e.g., 2 ×2 ×10 inch bar stock urethane) and projects from the mounting projection 184 in coaxial alignment therewith.

The anchoring end 186a of the resilient support 186 received within the mounting projection 184 is secured therein by a nut and bolt arrangement 190 extending through both the projection and support in aligned openings therein. A blade scraper unit 140 is secured to the upper or distal end of the support 186 by inserting the distal end through the square opening 188 formed in the blade mounting section 140a of the blade scraper unit. The blade mounting section is maintained on the support by a clevis pin arrangement 192 preventing dislodgement of the blade scraper unit from its support but allowing for fast and easy replacement by removal of the clevis and cotter pin.

If desired, and depending upon operating conditions, it will be appreciated that the secondary scraper assembly 180 described supra may be used without the primary assembly 115 such as in conjunction with seamed conveyor belts. Likewise, the primary assembly 115 may be used without the secondary assembly 180. The secondary assembly is preferably mounted at any point along the conveyor lower run 108b up to the center of the bottom of the downstream end roller.

The outer cross-sectional area of the distal ends of supports 186 corresponds to the cross-sectional area of openings 188 and, preferably, also has the same cross-sectional area as the projections 134 in the primary scraper assembly 115. This enables the same blade scraper units 140 to be interchangeably used as between the primary and secondary scraper assemblies.

As depicted in FIG. 6 only, each support 186 of secondary scraper assembly 180 may carry two of blade scraper units 140 mounted in spaced relationship from each other with additional clevis/cotter pin arrangement 192a. Due to the direction of travel C of conveyor lower run 108b, it is sufficient to maintain the left-hand scraper unit 140 (in FIG. 6) spaced from the right-hand scraper unit only with clevis 192a.

As mentioned above, secondary scraper assembly 180 is preferably used without primary assembly 115 in situations where scraping of a seamed conveyor belt will occur. Depending upon conditions, it may be desired to mount two or more scraper assemblies 115 in spaced relationship from each other along lower run 108b. In situations where the conveyor belt is not a seamed belt, primary scraper 115 may be employed with or without one or more secondary scraper assemblies 180.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

I claim:

1. A conveyor belt scraping assembly comprising:
   a) a support shaft means;
   b) individual scraper elements detachably mounted to the support shaft means; and
   c) means for moving the individual scraper elements into and out of contact with the conveyor belt wherein said individual scraper elements are formed of resilient material, at least one of said scraper elements adapted to contact center portions of the conveyor belt being formed of a material having a hardness greater than the hardness of the material forming adjacent ones of said scraper elements adapted to contact side portions of conveyor belt.

2. The assembly of claim 1, wherein said support shaft means includes a circular sahft adapted to be mounted to a conveyor support frame and a rectangular shaft mounted to the circular support shaft, wherein said individual scraper elements are each detachably mounted to the rectangular shaft.

3. The assembly of claim 2, further including mounting projections formed at spaced intervals along one side of the rectangular shaft, each scraper element including an opening formed in a mounting section thereof into which opening is inserted a respective one of said mounting projections, and further including a hold-down bar and clamping bolt for securing each scraper element to its respective mounting projection.

4. The assembly of claim 3, further including adjustable positioning collars mounted to the circular support shaft for positioning said shaft between side support plates mounted to the conveyor support frame.

5. The assembly of claim 4, wherein said moving means comprises a piston and cylinder arrangement connected to the circular support shaft via a lever arm, and means for supplying pressurized water into the cylinder to advance the piston and thereby the lever arm to rotate the scraper elements into scraping contact with the conveyor belt.

6. The assembly of claim 3, wherein said moving means includes a piston and cylinder arrangement, the piston connected to the circular support shaft through a lever arm and connecting piston rod, said cylinder being transparent to enable visual observations of the position of the piston head within the cylinder, and means for marking various locations of the piston head within the cylinder to monitor the extent of blade wear and thereby provide a visual indicator of the need for blade replacement.

7. The assembly of claim 6, wherein each scraper element has a scraper edge and a generally flat scraping surface terminating in the scraping edge, said scraping surface residing in a plane which is tangential to the surface of the conveyor belt in the scraping position.

8. The assembly of claim 2, wherein said rectangular shaft is formed with mounting projections respectively receiving ends of connecting bars projecting orthogonally from the rectangular shaft, distal ends of said connecting bars being connected to respective individual scraper elements to support said elements in relation to said rectangular shaft.

9. The assembly of claim 8, wherein each mounting projection is hollow to receive an anchoring end of each connecting bar, and means for bolting said anchoring end within the mounting projection, each individual scraper element including an opening in a blade mounting section thereof adapted to receive the distal end of the connecting bar, and clevis and cotter pin means for detachably securing the scraper element to the distal end of the connecting bar.

10. A conveyor belt scraper assembly comprising;
    a) scraper blade means contactable with the surface of the conveyor belt before removing detritus from the conveyor belt surface in a scraping position in said scraper blade means; and
    b) means for moving the scraper blade means into and out of contact with the conveyor belt,
    wherein said scraper blade means is formed of a material defining a scraping edge having a center portion of a hardness greater than lateral portions of the scraping edge located adjacent the center portion, the center portion of the scraping edge being adapted to contact a center portion of the conveyor belt where greater amounts of abrasive material to be scraped from the belt tend to accumulate relative to the amounts of abrasive material traveling on the belt along side portions thereof, said center portion of the scraping edge of greater hardness than the side portions thereby being more resistant to wear than the side portions to enable the overall scraping edge to remain substantially linear during continued use.

11. The assembly of claim 10, wherein said scraper blade means includes a plurality of individual scraper blade elements detachably mounted to support shaft means.

12. A conveyor belt scraping assembly comprising:
    a) a support shaft means;
    b) individual scraper elements detachably mounted to the support shaft means; and
    c) means for moving the individual scraper elements into and out of contact with the conveyor belt, wherein said moving means includes a piston and cylinder arrangement, the piston connected to the support shaft means through a lever arm and connecting piston rod, said cylinder being transparent to enable visual observations of the position of the piston head within the cylinder, and means for marking various locations of the piston head within the cylinder to monitor the extent of blade wear and thereby provide a visual indicator at the need for blade replacement.

* * * * *